Feb. 7, 1950  V. STODDARD  2,496,822
FOLDABLE GAFF HOOK

Filed Nov. 15, 1945  2 Sheets-Sheet 2

Inventor
Vine Stoddard

By Clarence A. O'Brien
and Harvey B. Jacobson
Attorneys

Patented Feb. 7, 1950

2,496,822

UNITED STATES PATENT OFFICE 2,496,822

FOLDABLE GAFF HOOK

Vine Stoddard, Jesup, Iowa

Application November 15, 1945, Serial No. 628,744

1 Claim. (Cl. 43—5)

The present invention relates to new and useful improvements in foldable gaff hooks for lifting fish and including a hook section and a handle section pivotally connected to each other together with means for rigidly supporting the sections in open longitudinally aligned position when in use, or in retaining the sections in a folded position so that the article may be handled with safety when not in use.

A further object of the invention is to provide a device of this character including a detachable strap to facilitate the handling of the hook and for lifting a fish from water into a boat.

A still further object of the invention is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is a side elevational view showing the hook in folded position.

Figure 5 is an enlarged fragmentary sectional view taken substantially on a line 5—5 of Figure 1.

Figure 1:
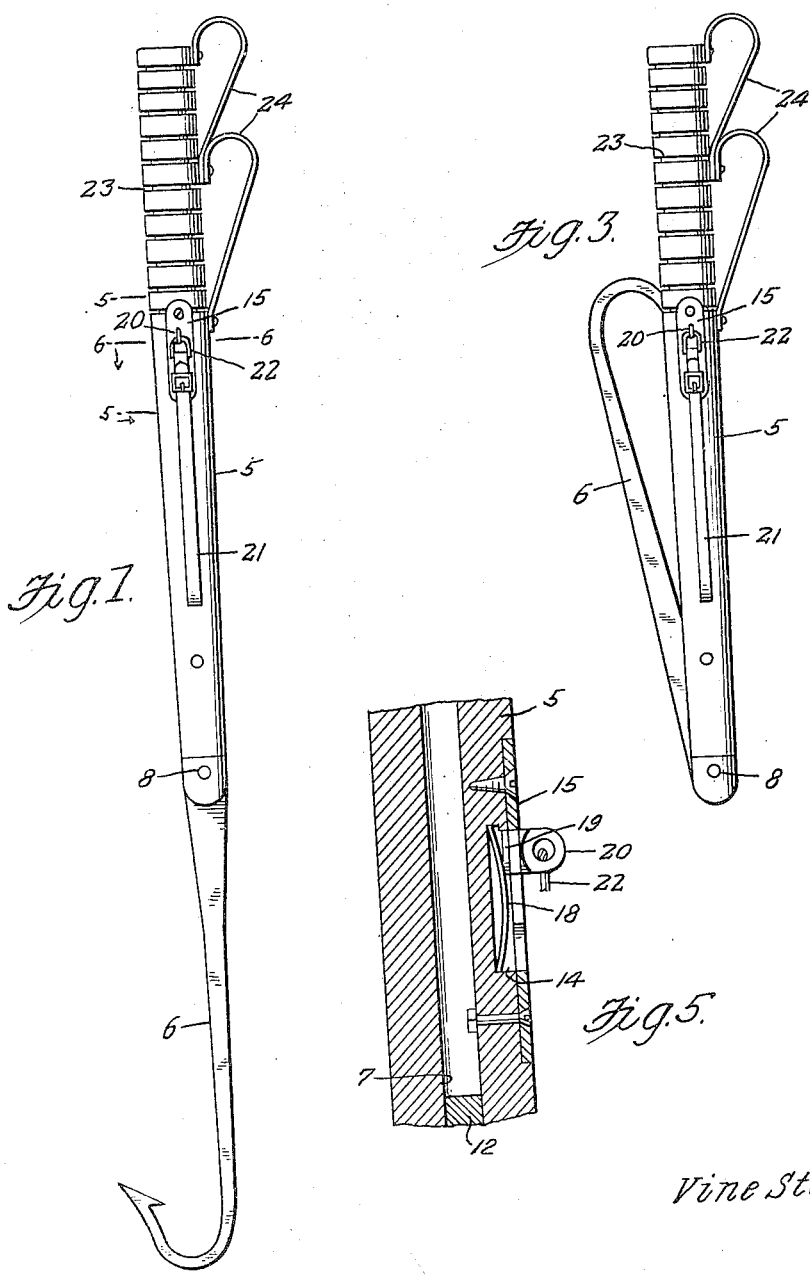
Figure 1 is a side elevational view showing the hook in open position.
Figure 2:
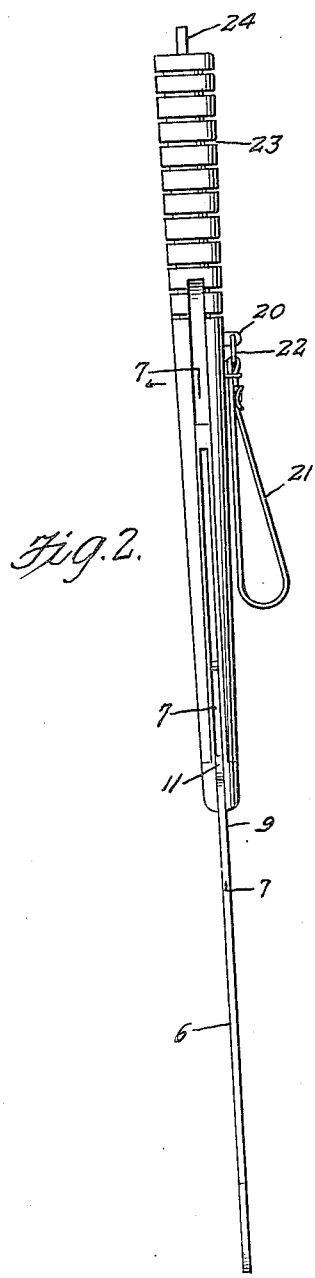
Figure 2 is a front elevational view.
Figure 4:
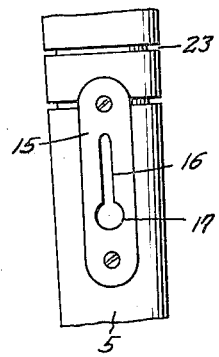
Figure 4 is an enlarged fragmentary side elevational view showing the keyhole slot for detachably connecting the strap thereto.

Referring now to the drawings in detail wherein for the purpose of illustration I have disclosed a preferred embodiment of the invention, the numeral 5 designates the handle section while the numeral 6 designates the hook section of the gaff hook, one side of the handle section 5 at its lower portion being formed with a longitudinally extending slot 7 in the lower portion of which the shank of the hook 6 is pivotally attached by means of a transverse pin 8.

The slot 7 is adapted to receive the shank and barb of the hook when the latter is in its folded position as shown in Figure 3 of the drawings.

The pivoted end of the hook 6 is flattened as indicated at 9 and formed at one edge with a shoulder 10 and formed at its opposite edge with an inclined portion 11.

Figure 7:
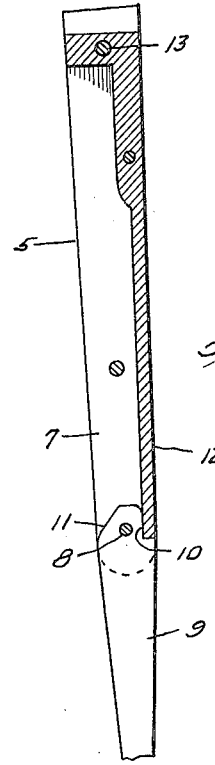
Figure 7 is an enlarged fragmentary longitudinal sectional view taken on a line 7—7 of Figure 2.
Figure 6:
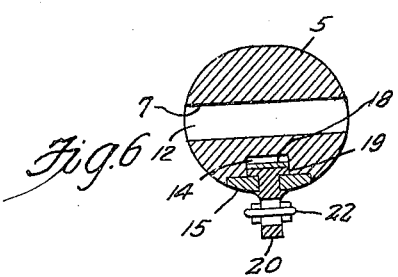
Figure 6 is a transverse sectional view taken on a line 6—6 of Figure 1.

A leaf spring 12 is positioned in the rear edge of the slot 7 and secured at its upper end to the handle 5 by means of rivets or the like 13. The lower portion of the spring 12 is free and adapted to conformably seat in the shoulder 10 of the hook in a manner as illustrated in Figure 7 of the drawings whereby to retain the hook in its open or longitudinally aligned position and without danger of accidental folding of the hook.

The hook 6 may be folded by forcing the lower end thereof upwardly into the position as shown in Figure 3 of the drawings whereby the lower end of the spring 12 will engage the inclined edge 11 of the shank of the hook and secure the hook in its folded position with the barb thereof positioned in the upper portion of the slot 7.

The intermediate portion of the handle 5 is formed in one side with a recess 14 over which is secured a plate 15 having a keyhole slot 16 formed therein, the keyhole slot including an enlarged opening 17 at its lower end. Positioned behind the plate 15 is an arcuate leaf spring 18 having its outwardly curved surface bearing against the plate and adapted to frictionally contact an annular head 19 in the upper portion of the recess 14 behind the plate 15, the head being formed on the inner end of an eye 20 to which a flexible strap loop 21 is attached by means of a metal loop 22. The strap loop 21 is provided for grasping by one hand while the handle 5 is grasped by the other hand so that the gaff may be easily lifted by both hands to facilitate lifting heavy fish caught on the hook 6. An upward force exerted on the strap 21 while lifting a fish engaged by the hook will urge the head 19 and eye 20 upwardly in the slot 16 to prevent accidental removal of the strap from the handle. The strap may be detached from the handle by sliding the head 19 downwardly into registry with the opening 17 whereby the head may be withdrawn therefrom. The strap loop 21 is attached to the handle 5 by inserting the head 19 in the enlarged opening 17 of the keyhole slot 16 and then pulling upwardly on said loop to slide said head 19 behind the narrow portion of said slot 16.

The upper portion of the handle 5 is formed with longitudinally spaced annular grooves 23 to provide a hand grip and a pair of leather strap loops 24 may also be attached to the upper portion of the handle to receive the fingers of a hand grasping the handle 5 and prevent slipping of the hand from the handle.

In view of the foregoing description taken in conjunction with the drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What is claimed is:

A fishing gaff comprising an elongated handle for grasping by one hand and having a gaff hook on one end thereof, strap loops on one side of said handle spaced along the same for insertion of the fingers of said hand therethrough to prevent said hand from slipping off the handle, and a strap loop attached at one end to an immediate portion of the handle for extension alongside the handle and insertion of the other hand therethrough, said handle and last-mentioned strap loop providing for lifting the gaff handle with both hands to facilitate lifting a heavy fish caught on said hook.

VINE STODDARD.

REFERENCES CITED

The following references are of record in the file of this patent:

UNITED STATES PATENTS

| Number | Name | Date |
|---|---|---|
| 827,246 | Livingston | July 31, 1906 |
| 1,258,632 | Harris | Mar. 5, 1918 |
| 1,283,772 | Holtzman | Nov. 5, 1918 |
| 1,302,457 | Ureck | Apr. 29, 1919 |
| 1,532,239 | Fauser | Apr. 7, 1925 |